United States Patent
Gootherts et al.

(10) Patent No.: US 7,594,233 B2
(45) Date of Patent: Sep. 22, 2009

(54) PROCESSING THREAD LAUNCHING USING VOLUNTEER INFORMATION

(75) Inventors: Paul Gootherts, Santa Clara, CA (US); Douglas V. Larson, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1547 days.

(21) Appl. No.: 10/183,443

(22) Filed: Jun. 28, 2002

(65) Prior Publication Data

US 2004/0003023 A1    Jan. 1, 2004

(51) Int. Cl.
*G06F 9/46* (2006.01)
*G06F 15/76* (2006.01)

(52) U.S. Cl. .................. 718/105; 712/28; 718/104
(58) Field of Classification Search ......... 718/100–108; 712/228, 225, 28; 709/217–229, 201–207
See application file for complete search history.

(56) References Cited

U.S. PATENT DOCUMENTS

| | | | | |
|---|---|---|---|---|
| 4,748,558 A * | 5/1988 | Hirosawa et al. | ............ | 718/105 |
| 5,115,505 A * | 5/1992 | Bishop et al. | ............... | 718/104 |
| 5,446,892 A * | 8/1995 | Suzuki et al. | ................ | 714/31 |
| 5,692,192 A * | 11/1997 | Sudo | ......................... | 718/105 |
| 5,745,778 A * | 4/1998 | Alfieri | .......................... | 712/1 |
| 5,826,081 A * | 10/1998 | Zolnowsky | ................. | 718/103 |
| 5,870,604 A * | 2/1999 | Yamagishi | .................. | 718/105 |
| 5,872,972 A * | 2/1999 | Boland et al. | ............... | 718/102 |
| 6,006,248 A * | 12/1999 | Nagae | ........................ | 718/105 |
| 6,081,826 A * | 6/2000 | Masuoka et al. | ........... | 718/100 |
| 6,289,369 B1 * | 9/2001 | Sundaresan | ................ | 718/103 |
| 6,292,822 B1 * | 9/2001 | Hardwick | ................... | 718/105 |
| 6,658,449 B1 * | 12/2003 | Brenner et al. | ............. | 718/105 |
| 6,735,769 B1 * | 5/2004 | Brenner et al. | ............. | 718/105 |
| 6,748,593 B1 * | 6/2004 | Brenner et al. | ............. | 718/105 |
| 7,203,747 B2 * | 4/2007 | Bhat et al. | ................. | 709/224 |
| 7,203,943 B2 * | 4/2007 | Shaffer | ...................... | 718/104 |
| 2002/0099759 A1 * | 7/2002 | Gootherts | ................... | 709/105 |
| 2003/0005025 A1 * | 1/2003 | Shavit et al. | ................ | 709/102 |
| 2005/0102677 A1 * | 5/2005 | Gootherts | ................... | 718/105 |

\* cited by examiner

*Primary Examiner*—Li B Zhen
*Assistant Examiner*—Charles E Anya (57) ABSTRACT

A method of and computer system for selecting a processor of a computer system on which to launch a processing thread is described. Each processor load is compared with a volunteer load of a volunteer information. If the processor load is lower than the volunteer load, the volunteer information is updated with the compared processor information. If the compared processor is the current volunteer and the compared processor load is higher than the volunteer load, the volunteer information is updated with the compared processor information.

6 Claims, 5 Drawing Sheets

PROCESSING THREAD LAUNCHING USING VOLUNTEER INFORMATION

FIELD OF THE INVENTION

The present invention relates generally to a processing thread launch method using volunteer information, and a computer system for performing the method.

BACKGROUND ART

Operating System

A kernel is the executable software controlling the operation of a computer system. The kernel is loaded into main memory first on startup of a computer system and remains in main memory providing essential services, such as memory management, process and task management, and disk management. The kernel manages multiple aspects of process execution on a computer system. Processes may be typical programs such as word processors, spreadsheets, games, or web browsers. Processes are also underlying tasks executing to provide additional functionality to either the operating system or to the user of the computer. Processes may also be additional processes of the operating system for providing functionality to other parts of the operating system, e.g., networking and file sharing functionality.

The kernel is responsible for scheduling the execution of processes and managing the resources made available to and used by processes. The kernel also handles such issues as startup and initialization of the computer system.

As described above, the kernel is a central part of an operating system (OS). Additional software or code, e.g., a program, process, or task, is written for execution on top of or in conjunction with the kernel, to make use of kernel-provided services, information, and resources.

Threads

Processes executing on a processor, i.e., processes interacting with the kernel executing on a computer system, are also known as execution threads or simply "threads." A thread is the smallest unit of scheduling on an OS. Normally, each process (application or program) has a single thread; however, a process may have more than one thread (sometimes thousands). Each thread can execute on its own on an operating system or kernel.

Load Balancing of OS

The kernel allocates threads for execution to different processors using a process known as load balancing. During typical load balancing of multiple processor computer systems, each processor is evaluated to determine the current load on the processor. The load on a particular processor is determined by counting the number of threads ready to run on the processor, e.g., the number of threads in a processor queue. Three load balancing methods are now described.

Example of Load Balancing

Run-With-Parent

In Run-With-Parent load balancing, the new thread runs on the same processor as the thread that created it. This form of load balancing is easily implemented and runs very fast, but can produce large load imbalances when large numbers of new threads are not dissipated by some other means (usually separate load balancing software).

Round-Robin

In Round-Robin load balancing, the new thread runs on a processor chosen from a list using a scheme such that no processor is chosen again until every processor has been chosen once. This form of load balancing is easily implemented and runs very fast, but has an inherent positive feedback loop such that this form of load balancing exaggerates small load imbalances until they become large load imbalances.

Lightest-Loaded

In Lightest-Loaded load balancing, the new thread runs on the processor with the lightest current load. This form of load balancing is easily implemented and avoids the problem of load imbalances associated with the round-robin load balancing method, but can be expensive to run on systems with many processors because each processor act of thread creation requires that a processor check all the other processors to find the one with the lightest load. In addition to scaling poorly, each processor creating a new thread disturbs part of the cache of every other processor, resulting in lower system performance.

As described above, prior solutions include choosing the parent thread's processor (which can create load imbalances), choosing the lightest-loaded processor (which helps balance the load but has not performed or scaled well), and round-robin (which sounds fair, but which actually encourages load imbalances).

Load balancing problems show up as excessive kernel thread migration under both light and heavy loads. During experiments performed by the inventor, an increased (processor-to-processor) thread and/or process migration (even on lightly-loaded systems) was observed on systems using one of the above-described load balancing technique.

Heavy Loads (SDET)

Software Development Environment Throughput (SDET) is a widely-used benchmark designed to simulate a timeshare system under heavy load by many typical users running many generally short-lived programs. As a result, the fork/exec/exit paths are used extensively.

Thread migration occurs under the following circumstances:

1. a thread binds itself to a processor its not currently running on;
2. a thread performs an I/O operation whose driver is bound to another processor;
3. an idle processor steals a thread waiting on another processor's run queue; and
4. the load balancer moves a thread from a heavily-loaded processor to a lightly-loaded processor.

Inventor measurements revealed that circumstances 1 and 2 above do not occur while running SDET. Circumstance 3 occurs only during cool-down at the end of the run and is not a factor during the main part of the run. Therefore, circumstance 4 was investigated more closely.

In the absence of real-time threads (as in SDET), the load balancer only moves threads from processor to processor when the distribution of threads waiting to run wanders far (enough) out of balance, i.e., beyond a predetermined threshold.

Figure 1:
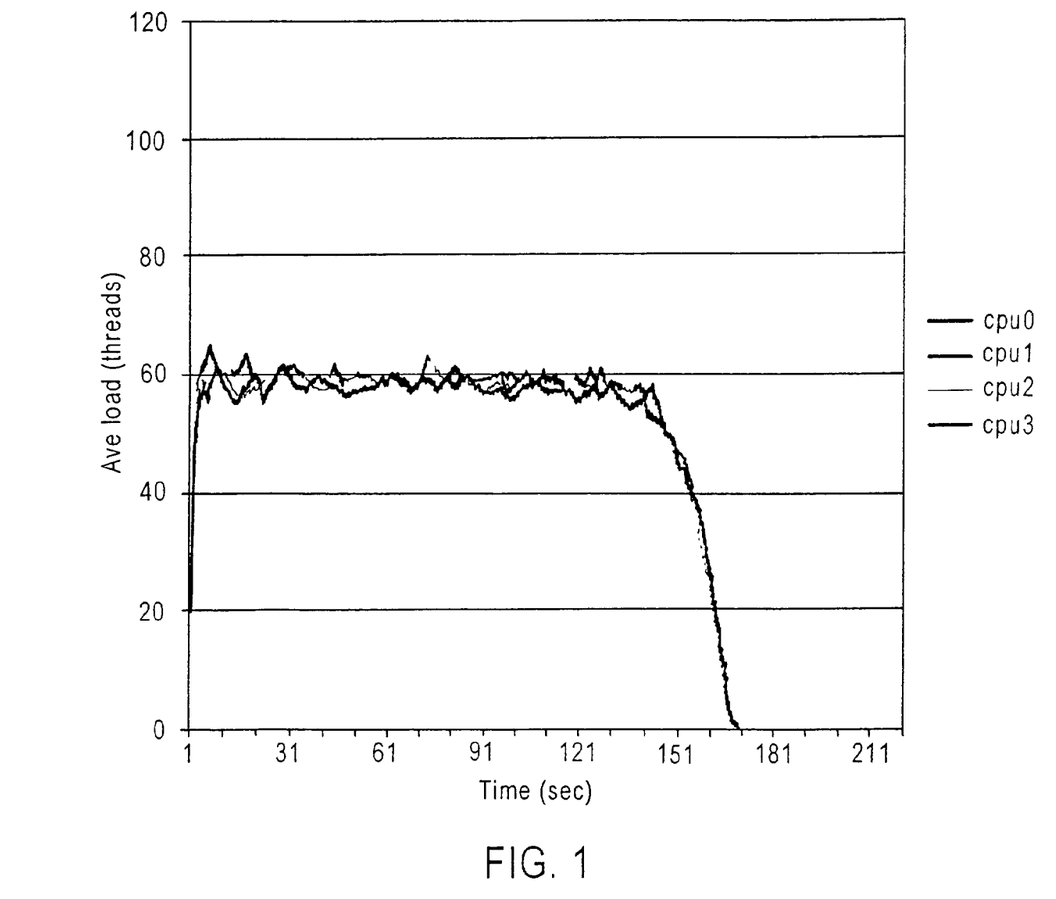
FIG. 1 is a graph of load measurements for a four processor computer system using lightest-loaded load balancing.
Figure 2:
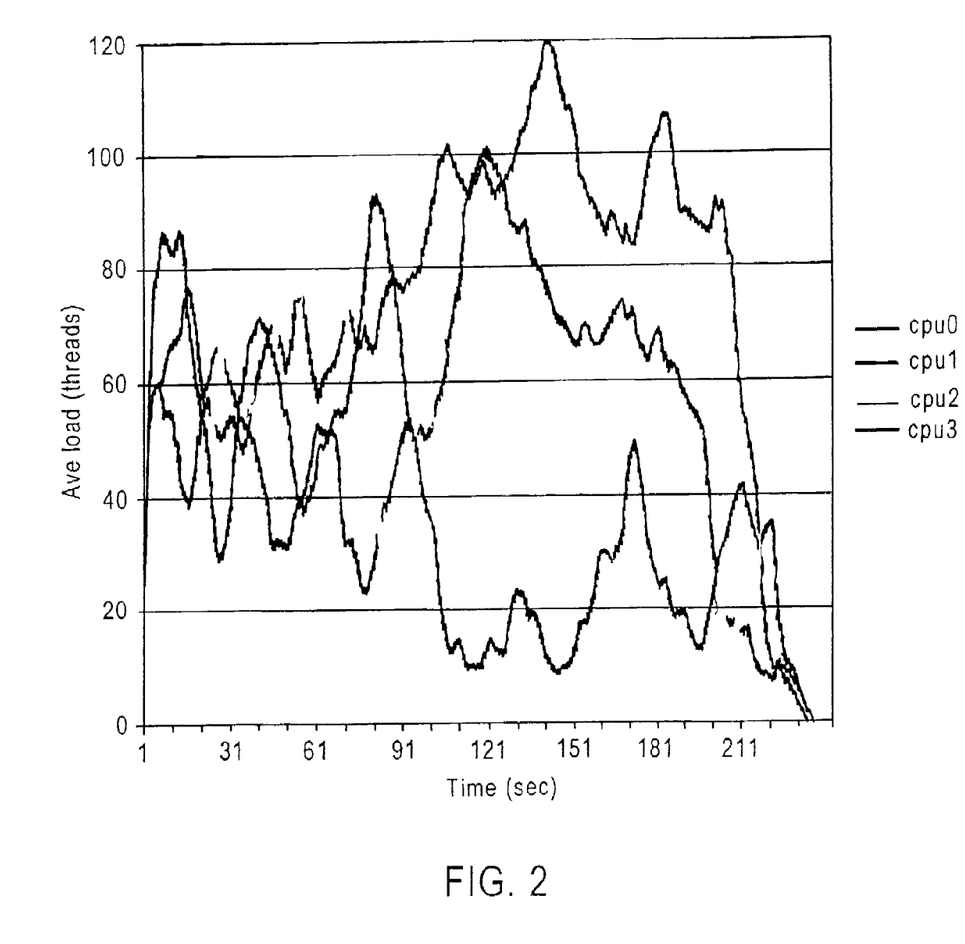
FIG. 2 is a graph of load measurements for a four processor computer system using round-robin load balancing.

With this in mind, the number of threads waiting to run on each processor at each second during an SDET run was measured on a four processor computer system, but using two different load balancing techniques. FIG. 1 is a graph of the measurements for the four processor system using a lightest-loaded technique. FIG. 2 is a graph of the same measurement for a similar run on the system using a round-robin technique. Similar results were measured on a different 4-way (i.e., 4 processor) and a, 8-way (i.e., 8 processor) system, as well as on a 32-way (i.e., 32 processor) system.

There is a greater load variation on the second system as shown in FIG. 2 in comparison to FIG. 1. The root cause is the thread launch policy, which changed in the second system. Three of the thread launch policies investigated include: Father Knows Best, Lightest-Loaded and Round-Robin.

Father Knows Best is easily implemented, runs very fast, and provides good cache behavior because common UNIX idioms (like "a|b") are implemented to share processor caches. The main fault of the Father Knows Best policy is a heavy reliance on the load balancer to prevent large load imbalances.

Lightest-Loaded does not depend on the load balancer to correct load imbalances, but does not scale well. This is because every processor's load statistics are scanned on every fork, so the cache i.e., processing queue, lines are constantly bouncing from processor to processor when the system forks frequently (as happens in SDET).

At first, Round-Robin may seem a fair way to solve these problems. After all, each processor is handed the same amount of work so the load balancer is not heavily relied on, and it should scale well because the implementation is simple and doesn't require any processor to look at another processor's resources. In fact, Round-Robin is not fair at all. During an SDET run, Round-Robin ensures that the thread creation rate on each processor is equal to all the other processors. But, any processor with a higher-than-average load will have a thread extinction or termination rate lower than average. This is because the increased load means each thread takes longer to finish. Therefore, the load on processors with slightly higher than average loads increases over time.

Similarly, any processor with a lower-than-average load has a thread extinction rate higher than average. This is because the decreased load means each thread finishes sooner. Therefore, the load on processors with slightly lower than average loads decreases over time.

This is a positive feedback loop. Heavily-loaded processors get even heavier loads and lightly-loaded processors get even lighter loads. Any small load imbalance is amplified using a Round Robin launch policy.

The load balancer attempts to even things out, but can't keep up. One reviewed solution of having the load balancer run more often, or making it move more threads per pass does not help. It only increases the excessive thread migration and lowers throughput.

Light Loads

A round-robin launch policy explains excessive thread migration on a very lightly loaded system. In an exemplary 4-way system, one compute-bound program is running and a few users at workstations are typing an occasional simple, short-lived command (ls, for example).

The round-robin launch policy starts each of these commands on a different processor as time passes. Every fourth launch (on average), the launch policy chooses the processor where the compute-bound process is running. Because the compute-bound process has used a lot of time recently, its priority is weak, i.e., the process will be less likely to obtain processor time. For similar reasons, the new process' priority is strong. The new process runs immediately, preempting the compute-bound process. The compute-bound process is returned to its run queue where it is immediately moved to an idle processor. After a few more forks, time passes, and the processor with the compute-bound process has the process migrated to yet another processor. This continues indefinitely with the computer-bound process being moved among the processors.

The Father Knows Best launch policy does not exhibit this problem because the new thread starts on the same processor as its parent which cannot be where the compute-bound process is running (since they are both running at the same time).

The Lightest-Loaded launch policy does not exhibit this problem because the new thread is not started on the processor where the compute-bound process is running because this processor does not have the lightest load.

DISCLOSURE/SUMMARY OF THE INVENTION

It is therefore an object of the present invention to improve selection of the processor on which to launch a processing thread in a computer system.

The above described object is fulfilled by a method aspect of selecting a processor on which to launch a processing thread. Each processor load is compared with a volunteer load of volunteer information. If the processor load is lower than the volunteer load, the volunteer information is updated with the compared processor information. If the compared processor is the current volunteer and the compared processor load is higher than the volunteer load, the volunteer information is updated with the compared processor information.

In another embodiment of the present invention, a method aspect includes selecting the processor for processing thread launch by comparing a processor load with a volunteer load of a stored volunteer information. If the processor load is lower than the volunteer load, the volunteer information is updated with the compared processor information. If the compared processor is the current volunteer, the volunteer information is updated with the compared processor information. A thread is launched using a thread launch policy using the volunteer information.

In a system aspect, the present invention includes a computer system for selecting a processor on which to launch a processing thread using volunteerism. The system includes one or more processors for receiving and transmitting data and a memory coupled to the one or more processors. The memory stores sequences of instructions which, when executed by one of the processors, cause one of the processors to compare the processor load with a stored volunteer load of a volunteer information. If the compared processor load is lower than the volunteer load, the volunteer information is updated with the compared processors information. If the compared processor is the current volunteer and the compared processor load is higher than the volunteer load, the volunteer information is updated with the compared processor information.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

A method and apparatus for determining, based on volunteer information, on which processor to launch a processing thread are described. In the following description, for purposes of explanation, numerous specific details are set forth in order to provide a thorough understanding of the present invention. It will be apparent; however, that the present invention may be practiced without these specific details. In other instances, well-known structures and devices are shown in block diagram form in order to avoid unnecessarily obscuring the present invention.

Multiprocessor Computer System

The present invention is operable on a computer system, as described in detail below, in particular, a computer system having multiple processors (more than one processor). Though the invention is described with reference to a multiprocessor computer system, the invention can operate on single processor computer systems.

Operating System (OS)

A preferred embodiment of the present invention provides a novel approach to selecting the appropriate processor for launching new processing threads. An added benefit is improved load balancing of threads of execution among multiple processors in a multiprocessor computer system.

At regular intervals, e.g., 1/100 second, each candidate processor "volunteers", i.e. compares its load to the current accepted volunteer load, to accept all new threads for the next small interval of time (that same 1/100 second). Only the candidate processor having the lightest load is accepted. After a candidate processor is accepted, and until the next round of volunteering, all new threads are started on the accepted volunteer processor.

Volunteering of processors works in the following manner. The process begins with the current volunteer processor identity and load at the time a candidate processor was accepted stored in memory as volunteer information. Each candidate processor executes instructions to compare its own load against the load of the current volunteer processor, i.e., the lightest loaded of current candidate processors. If the candidate processor's load is higher (i.e., worse), the candidate processor takes no further action until the next volunteer cycle. If the candidate processor's load is lower (i.e., better), the candidate processor executes instructions to cause the memory to replace the current volunteer processor information by overwriting the processor identifier and load stored in memory with the identifier and load of the candidate processor.

If the candidate processor is already the current volunteer processor, and the load of the candidate processor has increased since the last volunteer cycle, the candidate processor executes instructions to cause the memory to overwrite the volunteer processor load value in memory with the candidate processor's current load. In this manner, if another candidate processor has a lighter load, the other candidate processor will replace the current volunteer processor in the next volunteer cycle.

Figure 3:
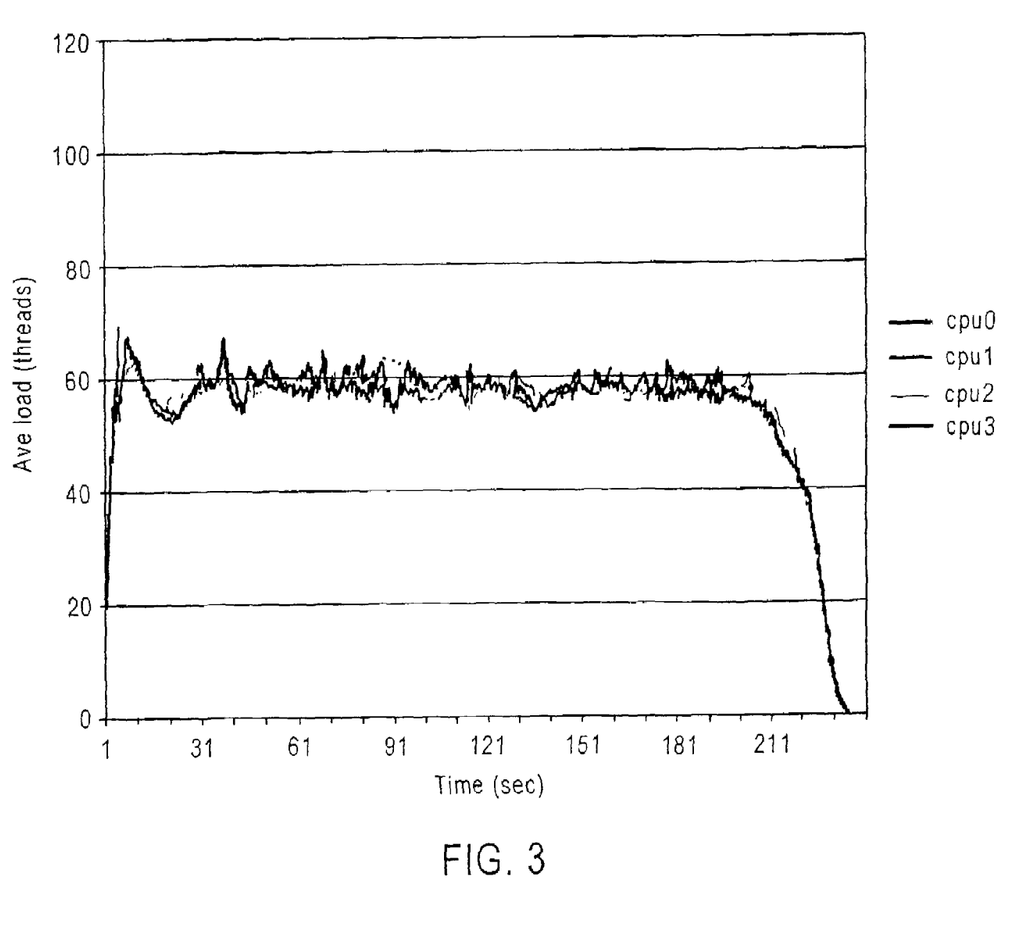
FIG. 3 is a graph of load measurements for a four processor computer system using a preferred embodiment of the present invention.

FIG. 3 is a graph of the improved load balancing behavior of a preferred embodiment of the present invention.

A preferred embodiment uses the Round-Robin thread launch policy, but augmented with a volunteer processor information. A locality domain (LDOM) is a grouping of processors together to share resources, e.g. memory. Each LDOM includes a volunteer processor which is a processor within that LDOM willing to be the thread launch target for that LDOM for the near future. If the volunteer information is valid, the thread launch policy uses the volunteer information. If the volunteer information is not valid, the processor executes kernel instructions to determine on which processor to launch a new thread of execution based on a Round-Robin thread launch policy.

The volunteer information can be invalid during system startup, i.e., before the first volunteer cycle. If a thread launches and the volunteer information is invalid, then a volunteer processor, as indicated by the invalid volunteer information, might be unable to accept a thread for execution. In that case, the processor executing kernel instructions uses another algorithm determine the processor on which to launch the thread.

Since the processor executing kernel instructions to determine on which processor to launch a thread is without a volunteer processor for a short time, the choice of thread launch policy is not important and any algorithm (such as father-knows-best) is acceptable. The invalid volunteer information state does not last long enough to develop any serious load imbalances on the processors of the computer.

There are other circumstances where the volunteer information may be invalid. For instance, if a user chooses to disable a processor, e.g., a user wants to remove a processor, and the disabled processor is the current volunteer, the processor executes kernel instructions to invalidate the volunteer information before shutting down the computer. The processor executes kernel instructions for (in the preferred embodiment) 1/100 second before checking volunteer information of the processors. Any load imbalance created in that time period is easily handled by a load balancer because the processor executing kernel instructions was without volunteer information for a limited time.

An impossibly high load stored in memory indicates invalid volunteer information. The next time a candidate processor executes instructions to compare its load to the current volunteer load; the processor's load will be lower than the load of the invalid volunteer information, so the candidate processor executes instructions causing its index and load to replace the current volunteer information stored in memory. Another candidate processor executing instructions may replace the volunteer information stored in memory very soon after, but there will be a volunteer processor.

Figure 4:
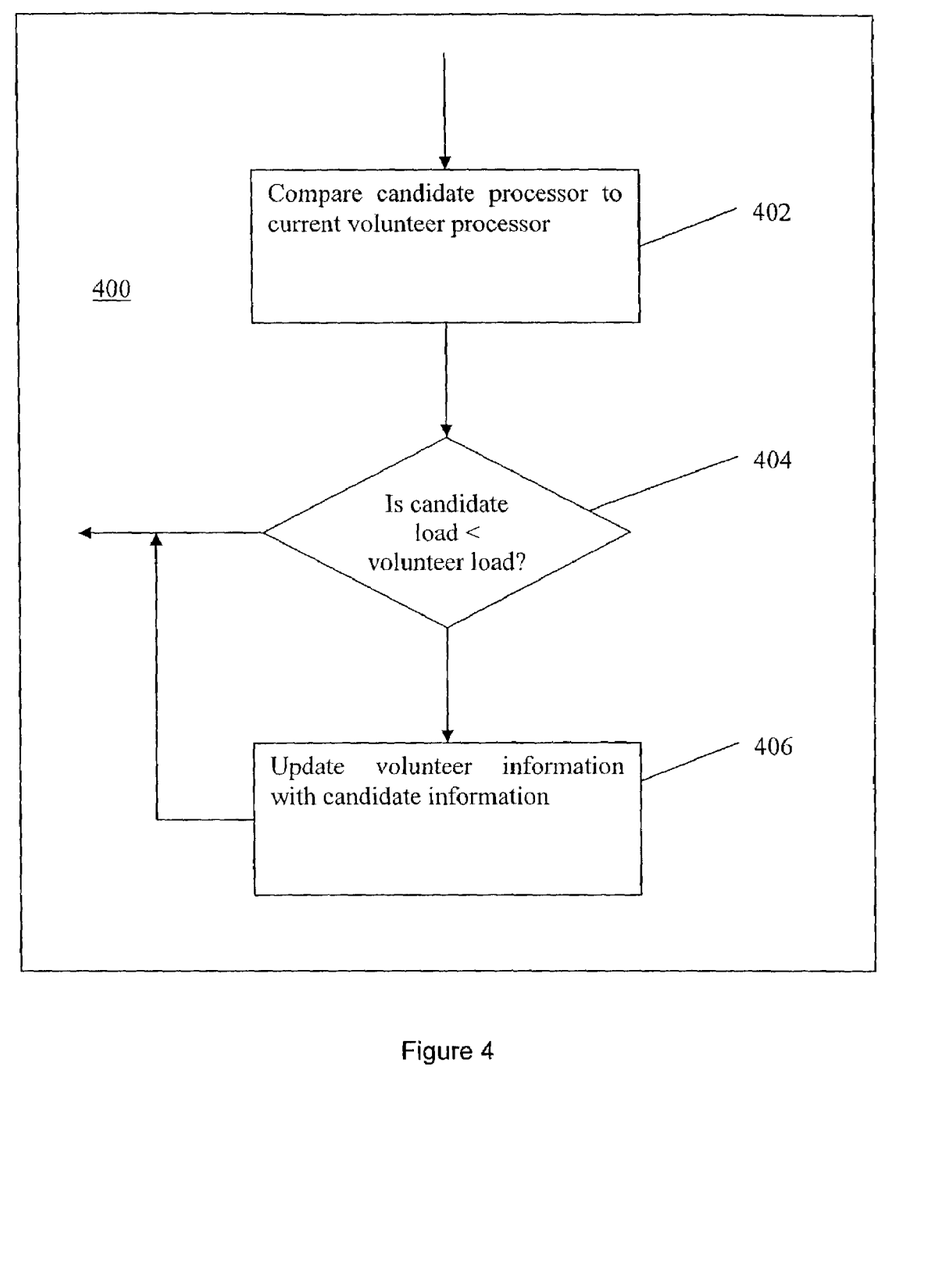
FIG. 4 is a high level flow diagram of an embodiment of the present invention.

With reference to the flow diagram of FIG. 4, the volunteer information is generated and updated by the candidate processors in the LDOM or computer system. A portion 400 of the kernel instruction execution flow executed by the candidate processors is shown in FIG. 4. Once per clock tick at step 402 each candidate processor executes instructions comparing its load to the load of the current volunteer processor in its LDOM stored in memory. At step 404, if the current volunteer processor has a heavier load, the candidate processor having a lower load proceeds to step 406 and replaces the current volunteer information. If not, the current volunteer information is not replaced and the processor execution of kernel instructions continues. If the candidate processor already is the current volunteer and its current load is higher than when it volunteered, the candidate processor replaces the load value stored in memory for comparison with other candidate processor loads. This way, another candidate processor is able to replace the current volunteer processor. Then, the processor kernel instruction execution continues.

In an additional embodiment, if the candidate processor is the current volunteer processor and the candidate processor's load is lower than when the candidate processor volunteered, the candidate processor lowers the volunteer load value stored in memory that the other candidate processors compare themselves against. As described above, this embodiment also accordingly raises the load value if the current processor load is higher.

The volunteer information consists of a processor index, i.e., a processor identifier, and a load. The load is the time-decaying average of the number of threads on the processor's execution queue. In a preferred embodiment, the volunteer information is stored in memory as a union of these two fields and a double integer so it can be loaded and stored atomically without requiring the use of memory locking mechanisms. Accordingly, the volunteer information can be out-of-date, but it can never be internally inconsistent.

Using an embodiment of the present invention, the advantages of a Lightest-Loaded thread launch policy were achieved without requiring a processor to scan the run queues of the other processors. The positive feedback loops of a Round-Robin thread launch policy are avoided and the over-reliance on the load balancer of a Father Knows Best thread launch policy is removed.

In addition, because the volunteer processor only changes, on average, once per clock tick, brief bursts of thread creation by individual processes usually end up on a single processor. This is good for the cache behavior of common command execution idioms like "a|b".

In an alternate embodiment, the small load imbalances shown in FIG. 3 are further reduced by having the processors volunteer more often than 100 times per second or by using an instantaneous load measurement instead of a smoothed one; however, there is extra run-time processor overhead associated with these modifications.

Hardware Overview

Figure 5:
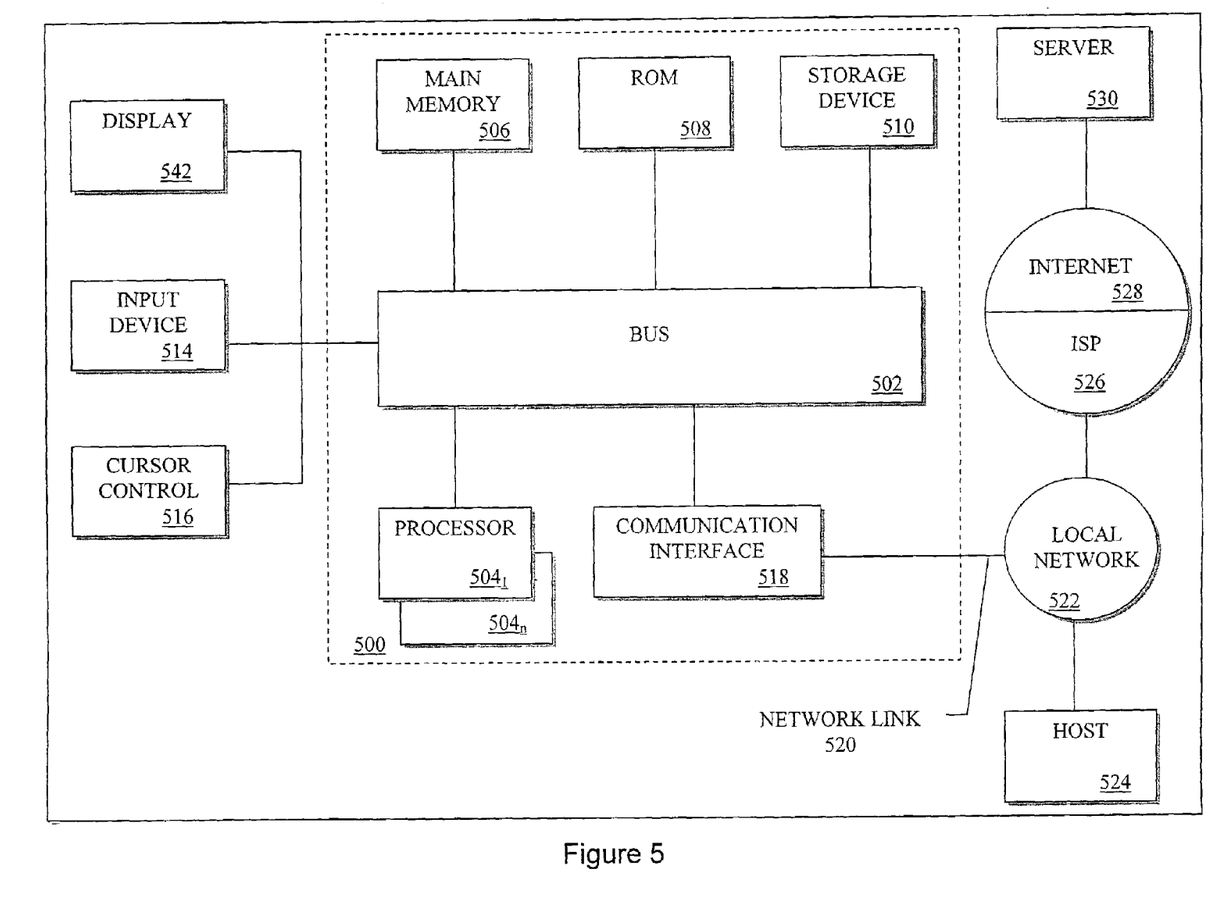
FIG. 5 is an example computer system for use with a preferred embodiment of the present invention.

FIG. 5 is a block diagram illustrating an exemplary computer system 500 upon which an embodiment of the invention may be implemented. The present invention is usable with currently available personal computers, mini-mainframes and the like.

Computer system 500 includes a bus 502 or other communication mechanism for communicating information, and a processor 504 coupled with the bus 502 for processing information. Although the computer system 500 is depicted as having multiple processors $504_1$-$504_n$, the following description refers to a single processor 504 for simplicity. It is to be understood that in alternate embodiments there may be multiple networked computer systems 500 having a single processor 504. Computer system 500 also includes a main memory 506, such as a random access memory (RAM) or other dynamic storage device, coupled to the bus 502 for storing transaction and interaction data, and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to the bus 502 for storing static information and instructions for the processor 504. A storage device 540, such as a magnetic disk or optical disk, is provided and coupled to the bus 502 for storing transaction and interaction data, inventory data, orders data, and instructions.

Computer system 500 may be coupled via the bus 502 to a display 542, such as a cathode ray tube (CRT) or a flat panel display. An input device 514, including alphanumeric and function keys, is coupled to the bus 502 for communicating information and command selections to the processor 504.

Another type of user input device is cursor control 516, such as a mouse, a trackball, or cursor direction keys for communicating direction information and command selections to processor 504 and for controlling cursor movement on the display 542. This input device typically has two degrees of freedom in two axes, a first axis (e.g., x) and a second axis (e.g., y) allowing the device to specify positions in a plane.

The invention is related to the use of computer system 500, such as the illustrated system of FIG. 5, to select a processor on which to launch a processing thread. According to one embodiment of the invention, the processor is determined by computer system 500 in response to processor 504 executing sequences of instructions contained in main memory 506 in response to input received via input device 514, cursor control 516, or communication interface 518. Such instructions may be read into main memory 506 from another computer-readable medium, such as storage device 510.

However, the computer-readable medium is not limited to devices such as storage device 510. For example, the computer-readable medium may include a floppy disk, a flexible disk, hard disk, magnetic tape, or any other magnetic medium, a compact disc-ROM (CD-ROM), any other optical medium, punch cards, paper tape, any other physical medium with patterns of holes, a RAM, a programmable ROM (PROM), an electrically programmable ROM (EPROM), a flash-EPROM, any other memory chip or cartridge, a carrier wave embodied in an electrical, electromagnetic, infrared, or optical signal, or any other medium from which a computer can read. Execution of the sequences of instructions contained in the main memory 506 causes the processor 504 to perform the process steps described below. In alternative embodiments, hard-wired circuitry may be used in place of or in combination with computer software instructions to implement the invention. Thus, embodiments of the invention are not limited to any specific combination of hardware circuitry and software.

Computer system 500 also includes a communication interface 518 coupled to the bus 502. Communication interface 508 provides two-way data communication as is known. For example, communication interface 518 may be an integrated services digital network (ISDN) card, a digital subscriber line (DSL) card, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals which carry digital data streams representing various types of information. For example, two or more computer systems 500 may be networked together in a conventional manner with each using the communication interface 518.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals which carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for processing thread launching using volunteerism.

The received code may be executed by processor 504 as it is received, and/or stored in storage device 510, or other non-volatile storage for later execution. In this manner, computer system 500 may obtain application code in the form of a carrier wave.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

For example, although, the invention is described with reference to a multiprocessor computer system, the invention can operate on single processor computer systems. Further, the invention can be practiced on computer systems comprising multiple networked computer systems each having single or multiple processors.

Additionally, though the invention is described with respect to multiple, same-speed processors, it is to be understood that the invention is applicable to multiple, different speed processors, e.g., different frequency processors, as well. Using different speed processors will effect the ranking order of the processors for load balancing purposes. For instance, a similar load value, i.e., number of processes in a processor queue, on a faster processor is actually a lighter load on the faster processor in comparison to the slower processor.

What is claimed is:

1. A computer-implemented method for launching a processing thread comprising the following steps:
    comparing each processor load of a corresponding one of a plurality of candidate processors with a volunteer load of a volunteer information during a first processing cycle; wherein the volunteer information comprises a processor identifier and the volunteer load;
    if the compared candidate processor load is lower than the volunteer load, updating the volunteer information with the processor identifier and the processor load of the compared candidate processor;
    during a next processing cycle, if the processor identifier of a particular candidate processor is the same as the processor identifier of the volunteer information and the particular candidate processor's load is higher than the volunteer load since a last processing cycle, updating the volunteer information with the particular candidate processor's load; and
    launching a processing thread using a thread launch policy using the volunteer information.

2. The method as claimed in claim 1, wherein the thread launch policy is one of round robin, lightest load, and father knows best.

3. A computer-implemented method for launching a processing thread on a computer system of a networked plurality of computer systems, comprising the following steps:
    comparing each of the networked plurality of computer system's load with a volunteer load of a volunteer information during a first processing cycle; wherein the volunteer information comprises a computer identifier and the volunteer load;
    if the compared computer system's load is lower than the volunteer load, updating the volunteer information with the computer identifier and the load of the compared computer system;
    during a next processing cycle, if the computer identifier of a particular computer system is the same as the computer identifier of the volunteer information and the particular computer system's load is higher than the volunteer load since a last processing cycle, updating the volunteer information with the particular computer system's load; and
    launching a processing thread using a thread launch policy using the volunteer information.

4. A computer system for launching processing threads comprising:
    one or more processors for receiving and transmitting data; and
    a memory coupled to said one or more processors, said memory having therein sequences of instructions which, when executed by one of said one or more processors, cause one of said one or more processors to compare its processor load with a volunteer load of a volunteer information during a first processing cycle; wherein the volunteer information comprise a processor identifier and the volunteer load;
    if the compared processor load is lower than the volunteer load, update the volunteer information with the processor identifier and the processor load of the compared processor;
    during a next processing cycle, if the processor identifier of the one processor is the same as the processor identifier of the volunteer information and the one processor's load is higher than the volunteer load since a last processing cycle, update the volunteer information with the processor load; and
    launch a processing thread using a thread launch policy using the volunteer information.

5. The system as claimed in claim 4, wherein the thread launch policy is one of round robin, lightest load, and father knows best.

6. The system as claimed in claim 4, wherein the processor load to volunteer load comparison is performed continuous with processor execution.

* * * * *